United States Patent [19]

Gordon

[11] Patent Number: 4,682,006
[45] Date of Patent: Jul. 21, 1987

[54] SELF-CLAMPING ARC LIGHT REFLECTOR FOR WELDING TORCH

[75] Inventor: Stephen S. Gordon, Tarzana, Calif.

[73] Assignee: The United States of America as represented by the Administrator of the National Aeronautics and Space Administration, Washington, D.C.

[21] Appl. No.: 913,447

[22] Filed: Sep. 30, 1986

Related U.S. Application Data

[63] Continuation-in-part of Ser. No. 783,890, Oct. 3, 1985, Pat. No. 4,633,060.

[51] Int. Cl.⁴ ................................................ B23K 9/00
[52] U.S. Cl. .................................. 219/124.34; 219/74; 219/130.01
[58] Field of Search ................ 219/74, 130.01, 124.34; 362/255, 304, 306, 341

[56] References Cited

U.S. PATENT DOCUMENTS

| | | | |
|---|---|---|---|
| 694,068 | 2/1902 | McOuat | 362/255 |
| 2,866,074 | 12/1958 | Ronay | 219/74 |
| 2,928,933 | 3/1960 | Andriola | 219/74 |
| 4,066,887 | 1/1978 | Levis | 362/341 |
| 4,488,032 | 12/1984 | Case, Jr. et al. | 219/124.34 |

FOREIGN PATENT DOCUMENTS

| | | | |
|---|---|---|---|
| 51-2641 | 1/1976 | Japan | 219/130.01 |
| 274271 | 11/1970 | U.S.S.R. | 219/124.34 |

*Primary Examiner*—Clifford C. Shaw
*Attorney, Agent, or Firm*—Joseph H. Beumer; John R. Manning; Leon D. Wofford, Jr.

[57] ABSTRACT

An electric welding torch (10) with an internal viewing system is provided an annular arc light reflector (34) to reflect light from the arc (30) back onto the workpiece. The reflector (34) has a vertical split or gap (40) in its surrounding wall to permit adjacent wall ends forming the split (40) to be sprung open slightly to permit the reflector to be removed or slipped onto the torch housing or gas cup (24). The upper opening (25) of the reflector (34) is slightly smaller than the torch housing or gas cup (24) and therefore, when placed on the torch housing or gas cup (40) has that springiness to cause it to clamp tightly on the housing or gas cup (24). The split or gap (40) also serves to permit the feed of weld wire therethrough to the weld area.

9 Claims, 6 Drawing Figures

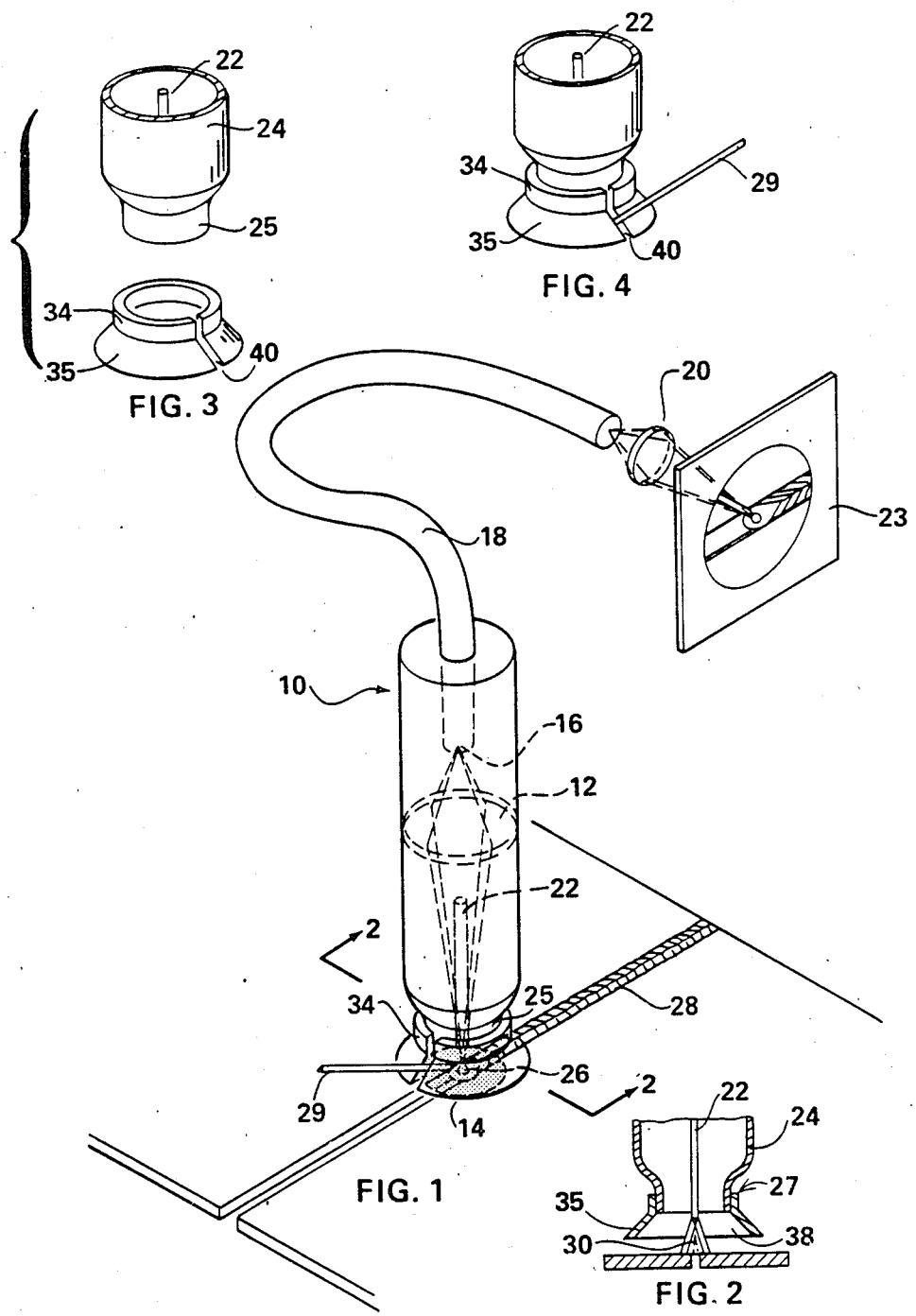

4,682,006

SELF-CLAMPING ARC LIGHT REFLECTOR FOR WELDING TORCH

ORIGIN OF THE INVENTION

The invention described herein was made in the performance of work under a NASA Contract and is subject to the provisions of Section 305 of the National Aeronautics and Space Act of 1958, Public Law 85-568 (72 Stat. 435, 42 USC 2457).

RELATED APPLICATION

This application is a continuation in part of applicant's co-pending application Ser. No. 06/783,890 filed Oct. 3, 1985, and entitled "Welding Torch with Arc Light Reflector," now U.S. Pat. No. 4,633,060.

BACKGROUND ART

The most promising methods of providing real-time weld process sensors for weld tracking have utilized some variation of optical sensing. The emerging vision technologies have included a coaxial optical system which involves the placement of the primary imaging lens within the surrounding housing of the electrode such that the lens optical axis is aligned with the electrode. The field of view is limited to the exit diameter of the housing or gas cup surrounding the electrode. Usually a fiberoptic image bundle is utilized to optically transmit the image to a camera in a remote location. Thus, the camera electronics are in a location remote from the harsh welding environment.

The lack of uniformity of light in the welding area—the welding arc being too bright and surrounding welding area too dark—has proven to be detrimental in using through-the-torch viewing because of the difficulty in recognizing features in the image which have widely different brightness. One solution to this problem was having large, expensive, bright, quartz, halogen electric lights directed onto the weld area, but this solution has not worked well.

STATEMENT OF THE INVENTION

It has been found that by using a coaxial extending metal mirror reflector attached to the electrode housing or gas cup the bright arc light is reflected back onto the darker surrounding areas providing a more even light distribution and, thus achieving a clearer more detailed image for the monitoring system. Also, such a metal reflector serves to shield the operator from the arc light, reducing the incidence of arc flash.

By use of an annular metal reflector having an upper opening of a diameter slightly less than the exit opening diameter of the torch housing or cup and having a vertical split or gap at one location about its annular wall the metal reflector becomes self-clamping on the housing or cup and the resulting gap or slot is made just wide enough to permit the feed of filler wire through at any angle to the workpiece.

Accordingly, it is an object of the present invention to provide an arc light reflector for welding torches having an internal optical viewing system.

Another object is to provide a reflector mirror on the end of the welding torch housing or cup to reflect the arc light onto the welding area and to shield the operator from the arc light.

Yet another object is to provide a self-clamping reflector mirror on the end of electric welding torch housing or cup which has a provision to permit the feeding of filler wire at a large range of angles.

BRIEF DESCRIPTION OF THE DRAWINGS

FIG. 1 is a schematic of a welding torch with a coaxial viewing system with a self-clamping arc light reflector.

FIG. 2 is a section view taken along a line 2—2 of FIG. 1 showing in more detail the arc light reflector.

FIG. 3 is a view showing the self-clamping arc light reflector detached from the welding torch gas cup.

FIG. 4 is a view of the arc light reflector on the end of the welding torch gas cup.

DETAILED DESCRIPTION OF THE INVENTION

Figure 5:
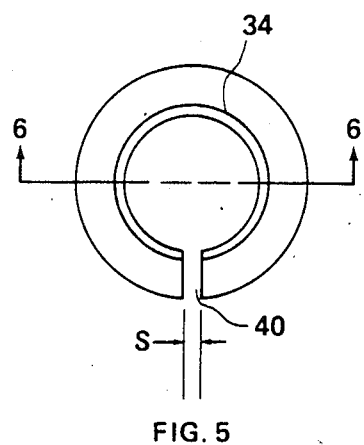
FIG. 5 is a top view of another embodiment of the self-clamping arc light reflector.

Referring to the drawings, FIG. 1 is a schematic of a welding torch 10 having an internal coaxial viewing system consisting of a lens 12 which focuses the field of view 14 of the weld scene of the workpiece onto the end 16 of the fiberoptic bundle 18. The transmitted image of the fiberoptic bundle 18 is provided to a camera lens 20 which focuses it onto a TV sensor array 23 for transmission. In this example, the welding torch 10 is the Gas-Tungsten-Arc (GTA) type and the internal lens 12 is above the electrode collet holder and aligned with the tungsten electrode 22. The field of view 14 is limited by the diameter of the gas cup 24 and in this example the view shows the weld pool 26 and the weld bead 28 and the cold feed wire 29. The scene is illuminated by the light from the arc 30. By extracting the location of the joint and weld pool edge features from a digitized TV image of the scene, the extracted information can be utilized to control the relative location of the joint, weld pool, size of the weld pool, and the cold wire feed rate.

To improve the clarity of the image of the monitoring system, a metal arc light reflector 34 is shown fitted to the end 25 of the torch housing or gas cup 24. The arc light reflector 34 as shown in FIGS. 2, 3 and 4 consists of a circular annular wall member with an upper circular opening 27 having an inner diameter slightly smaller than the outer surface diameter of the end of the housing or gas cup 24. The annular wall member is vertically split to form a slot or gap 40 at one location about its annular wall so that adjacent wall ends of the split may be spread slightly to increase its upper opening sufficiently to fit over the end of the housing or gas cup 24. The annular wall is made of a metal to provide springiness or resiliency to cause the spread annular wall to clamp tightly on the end of the housing or gas cup 24 so that no additional clamping mechanism is required. The vertical split 40 in the circumferential wall of the annular reflector is wide enough between adjacent ends to form a slot which permits feeding filler wire through at any angle to the workpiece. The slot 40 can be easily positioned for feeding wire from any rotated angle, therefore, any compound angle of wire feed can be accommodated.

The arc light reflector 34 has a vertical upper portion which clamps onto the end 25 of the housing or gas cup 24 and an outwardly extending lower flared portion 35. As shown in FIG. 2, the internal surface 38 of the outwardly extending lower flared portion 35 serves as the reflecting surface which reflects the bright arc light back onto the darker areas of the weld area 14 and thereby provides a more detailed image for the monitoring system.

The internal reflecting surface 38 could be a straight cone surface or a curved cup shaped surface. The reflecting surface could be smooth and polished for specular reflection or grooved or knurled for diffuse arc light reflection. The metal material for the arc light reflector is stainless steel but aluminum with various degrees of polishing and anodizing should be useful also.

Figure 6:
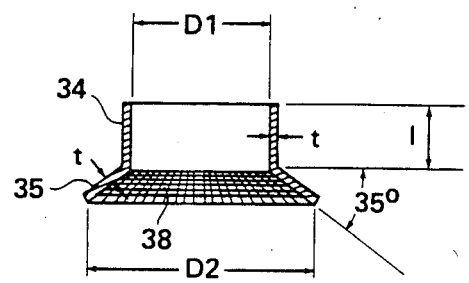
FIG. 6 is a sectional view taken along line 6—6 of FIG. 5 showing the knurled reflecting surface.

Another embodiment of the arc light reflector 34 is shown in FIGS. 5 and 6. In this embodiment the reflecting surface 38 is knurled as shown and it has been found to produce results superior to the smooth reflecting surface of the embodiment shown in FIG. 2. In this embodiment the slot 40 has a width S of 0.110 inch, an upper diameter D1 of 0.900 (+0.005 or −0.000) inch, a lower diameter D2 of 1.40 inch, a wall thickness t of 0.050 inch, and a vertical wall length l of 0.35 inch. As indicated the lower flared portion 35 makes an angle of 35 degrees with the horizontal.

The split wall arc light reflector 34 is simple but makes use of the intense arc light that is already present in the normal process of arc welding to provide an excellent image for the monitoring system which can more easily be digitized. It is relatively non-intrusive and the split slot easily accommodates the use of filler wire 29 at any angle.

While the invention has been described relative to a specific embodiment, it is evident that modifications and changes may be made with regard thereto without departing from the scope of the invention.

What is claimed is:

1. In an electric arc welding torch having a housing with an internal viewing system for viewing the weld area, the improvement comprising:
   an annular member on the end of the torch housing adjacent the welding area,
   said annular member having an internal reflective surface coaxially with the end of the arc welding torch and extending outwardly therefrom for reflecting the arc light onto the welding area thereby providing a more even light distribution and a clearer image for the internal optical viewing system,
   said annular member having a vertical split at one location along its circumference whereby adjacent ends forming the split may be spread to place or remove the annular member from the end of the torch housing.

2. An electric welding torch according to claim 1 further comprising:
   said split of the annular member having a width to permit weld filler wire to extend through.

3. An electric welding torch according to claim 2, further comprising:
   said internal reflective surface being a straight cone surface.

4. An electric welding torch according to claim 2 further comprising:
   said internal reflective surface being a curved cup surface.

5. An electric welding torch according to claim 1 further comprising:
   said internal reflective surface being knurled for diffuse arc light reflection.

6. In an electric arc welding torch comprising an electrode coaxially extending from a housing and through a surrounding gas cup, said housing having an internal viewing system consisting of optics which transmits the weld scene of the electrode arc onto an image transmission means, the improvement comprising:
   an arc light reflector with an upper opening fitted onto the end portion of said gas cup,
   said arc light reflector having an internal light reflecting surface extending outwardly from the upper opening to its lower edge,
   said arc light reflector having a vertical split at one location along its boundary whereby adjacent ends forming the split may be spread to place or remove the arc light reflector from the end of the torch housing,
   said internal reflective surface serving to reflect the bright arc light back onto the darker areas of the weld area and thereby provide a more detailed image for the internal viewing system.

7. An electric arc light reflector according to claim 6, further comprising:
   said split of the arc light reflector having a width to permit weld filler wire to extend through.

8. An electric arc light reflector according to claim 6, further comprising:
   said internal reflective surface being smooth.

9. An electric arc light reflector according to claim 6, further comprising:
   said internal reflective surface being knurled.

* * * * *